No. 893,342. PATENTED JULY 14, 1908.
E. MARZINKE.
HORSE RELEASING DEVICE FOR VEHICLES.
APPLICATION FILED DEC. 2, 1907.
2 SHEETS—SHEET 2.
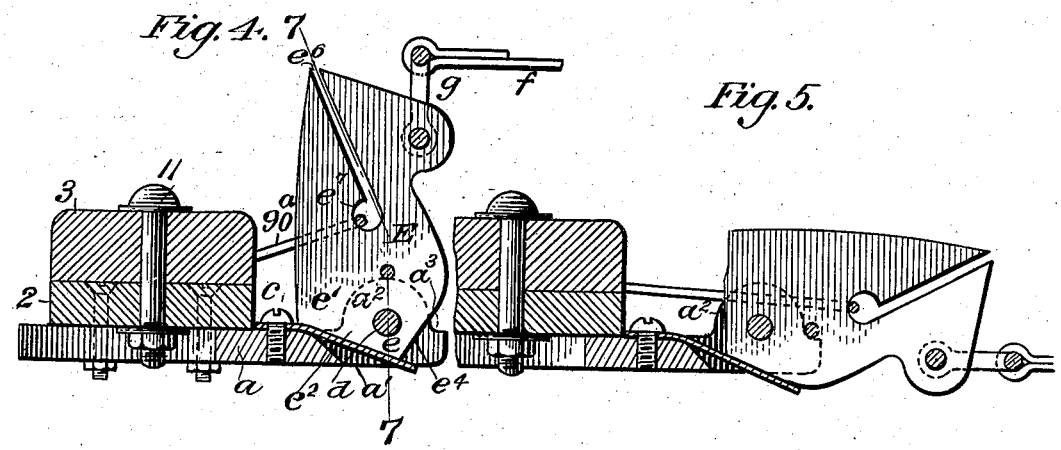
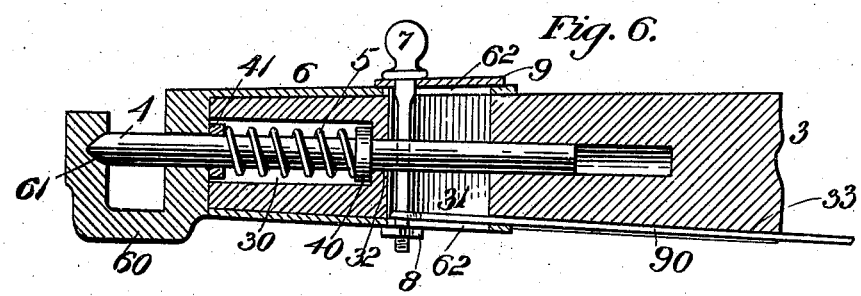
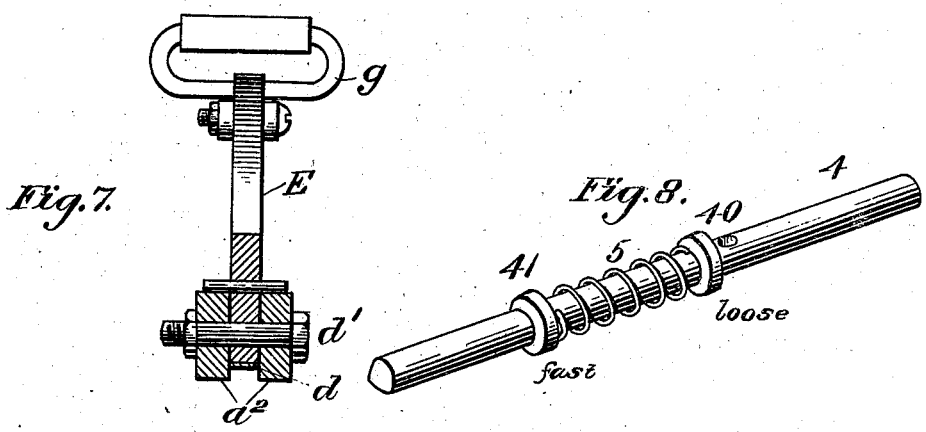
WITNESSES:
H. Woodard
Eleanor MacCormick
INVENTOR
Ernst Marzinke
BY
Fred G. Dieterich & Co.
ATTORNEYS

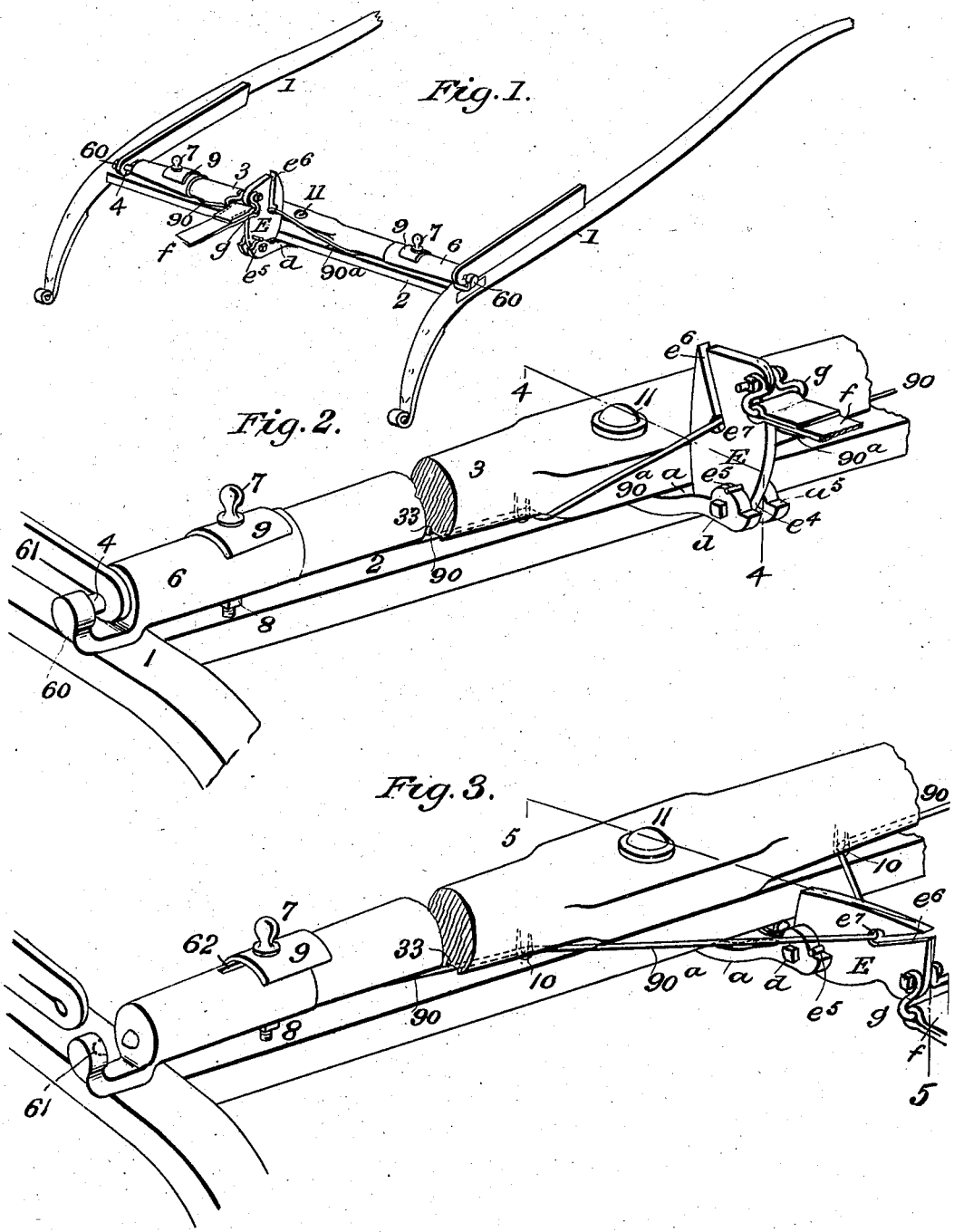

UNITED STATES PATENT OFFICE.

ERNST MARZINKE, OF CORONA, CALIFORNIA.

HORSE-RELEASING DEVICE FOR VEHICLES.

No. 893,342.  Specification of Letters Patent.  Patented July 14, 1908.

Application filed December 2, 1907. Serial No. 404,735.

To all whom it may concern:

Be it known that I, ERNST MARZINKE, residing at Corona, in the county of Riverside and State of California, have invented a new and Improved Horse-Releasing Device for Vehicles, of which the following is a specification.

This invention, which relates to a means for quickly releasing or detaching run-away horses from vehicles, has for its object to provide a means for the purposes stated, of a simple and economical character, that can be readily attached to any of the usual types of whiffletree cross bars without requiring any change in their arrangement or the connection of the whiffletree therewith, in which, under the usual or normal position, the whiffletree is free to move without danger of disarranging the adjustments or set of the releasing means, and whereby the latter can be instantly actuated by the occupant of the vehicle for releasing the traces from the whiffletree for freeing the horse.

With the above and other objects in view, my invention consists in the special construction and arrangement of parts, hereinafter described in detail, specifically pointed out in the appended claims and illustrated in the accompanying drawings, in which:—

Figure 1, is a perspective view that illustrates my invention as applied to a part of the vehicle running gear, the several parts being in their normal or set position. Fig. 2, is a perspective view of one end of the whiffletree, one of the trace holders and the releasing device, the parts being in their normal or trace securing position. Fig. 3, is a similar view that shows the devices adjusted to their "releasing" position, and the trace holding bolt drawn back. Fig. 4, is a transverse section, taken substantially on the line 4—4 on Fig. 2. Fig. 5, is a similar view on the line 5—5 of Fig. 3. Fig 6, is a longitudinal section of one of the whiffletree ends and the trace connection devices mounted thereon. Fig. 7, is a section thereof on the line 7—7 of Fig. 4. Fig. 8, is a perspective view of the sliding trace holding bolt.

In the drawings, 1—1 designate the vehicle shafts, and 2 the cross bar that connects them near their rear ends and upon which the whiffletree 3 is mounted in the usual manner. The whiffletree in my invention has its ends constructed to receive a special form of trace attaching devices that coöperate with the releasing devices proper, which are located centrally of the whiffletree and are adapted for being moved to a trace releasing position by the vehicle occupant, whereby to instantly detach both traces, as will be presently set out in detail.

Each end of the whiffletree has a long bore 30, which, near its inner end is bisected by an elongated transverse slot 31 and each of the said bores includes a portion of reduced diameter, whereby a shoulder 32 is provided that forms a stop for the washer 40 mounted on the trace bolt 4 that is slidably mounted within the bore 30 as clearly shown in Fig. 4, by reference to which it will also be noticed that the bolt 4 has a solid shoulder 41 that forms a bearing for a stout coil spring 5, the other end of which bears against the washer 40 that in turn bears against the stop shoulder 32, the said spring, by reason of the manner in which it is mounted serving to force the bolt to its outer or normal position as shown.

The outer end of the bolt 4 extends through the long ferrule 6 that is shrunk or otherwise made fast on the end of the whiffletree, the outer end of which has a trace loop or guard 60, provided with a socket 61 to receive the outer end of the bolt 4 when it is at its outer or trace securing position as shown in Fig. 6.

At diametrically opposite sides, the ferrule 60 has elongated slots 62 that register with the transverse elongated slot 31 in the whiffletree and through the said slots pass a headed bolt 7 that also passes through the sliding bolt 4 and is secured by a nut 8 as best shown in Fig. 6.

Co-acting with the bolt 7 is a dust guard or plate 9 through which the bolt 7 passes and which moves longitudinally of the ferrule as the bolt is shifted, which operation of the bolt may be done by pushing the end of the bolt inward when hooking up the traces and which, in an emergency, can be shifted by the releasing device, which I shall now describe.

Each of the whiffletree ends on its under side has a longitudinal recess 33 in which slidably fit the flexible members 90 that are preferably formed of a single strand of wire, whose ends terminate in a loop for fitting over the lower end of the bolt 7 and which are passed through a pair of guide eyes 10,—10 disposed at opposite sides of the whiffletree pivot or turn bolt 11, that part of the wire between the eyes 10 forming the loop 90ª.

The devices for simultaneously releasing the traces, which are best shown in Figs. 2 and 5, comprise a yoke shaped plate $a$ that is fastened by screw bolts on the under side of the cross bar 2 midway thereof, and which has a rearwardly extended bifurcated portion $a'$, between the members $a^2$—$a^2$ of which is projected a stout leaf spring $d$ that is made fast to the plate $a$ by a screw $c$ as best shown in Figs. 4 and 5, by reference to which it will also be noticed that the portion $a'$ has apertured ears $a^3$ to receive the pivot bolt $d$, upon which is fulcrumed the tripper or releasing member E.

The member E consists of an elongated body having an apertured ear $e$ at the lower end for fitting within the bifurcated portion of the plate $a$ so as to swing upon the bolt $d$, its lower inner edge $e'$ forming a stop shoulder for engaging the plate $a$ to limit the upward swing of the member E, which is automatically swung and held to its vertical position by the leaf spring $d$ that engages the seat $e^2$ at the lower edge of the said member E, which latter has an inner bearing surface $e^4$ on its outer edge that the spring $d$ impinges when the member is swung downwardly to the position shown in Fig. 5, the spring holding it to its lowered position, the stud $e^5$ that engages the stop shoulder $a^5$ on the member $a$ holding the said member E from swinging too far downwardly and breaking the spring $d$ when the device is pulled down by the strap $f$ that connects with the ring $g$ mounted on the upper rear edge of the member E and which, in practice, passes up through the bottom of the vehicle within convenient reach of the occupant.

The member E has a slot $e^6$ that extends diagonally downward and forwardly, and it terminates in an enlarged aperture $e^7$, the said aperture $e^7$ and the slot $e^6$ being relatively so disposed that the loop 90ª of the detaching wire can be readily slipped down into the aperture $e^7$.

From the foregoing, taken in connection with the accompanying drawing, the complete operation, manner of its use and the advantages of my invention, it is believed, will be readily apparent.

By reason of the construction and combination of parts, shown and described, should the horse run away or the occupant of the vehicle lose control of the horse, the animal can be instantly disengaged from the shafts by simply pulling on the strap, which will snap the member E backward to the position shown in Fig. 5, and thereby pull on the loop 91 sufficiently to draw the wire ends inwardly in the direction of the arrow on Fig. 1 and thereby simultaneously pull the trace bolts inwardly from engagement with the traces.

To set the trace holders in position for being utilized in the usual manner, it is only necessary to snap the member E up to its vertical position, the springs 5 for the trace bolts throwing the latter to their normal or trace connecting position.

Having thus described my invention, what I claim and desire to secure by Letters Patent, is:—

1. The combination with the swingletree, the trace holders slidable through the ends of the tree and spring held to their trace holding position; of means for drawing the holders simultaneously inwardly for releasing the traces, said means comprising a crank-like member pivotally mounted in the shaft frame, having a slot and a seat, a flexible connection that joins at the opposite ends with the opposite trace holders, said means, midway its ends, passing through the crank like member and engaging the seat therein, and means for lifting the said member operable from the vehicle, whereby to draw on the flexible connection and pull the trace holders inwardly to release the traces.

2. In a horse releasing means of the character described, in combination with the shaft frame, the whiffletree, pivotally mounted thereon and the trace holding bolts in the ends of the said whiffletree, automatically shifted to trace holding position; of a means for simultaneously pulling the bolts inward to release the traces, operable from the vehicle body, the said means comprising a flexible member secured at the opposite ends to the opposite bolts, guides about midway the tree through which the said flexible member passes, a plate mounted on the shaft frame, projected rearwardly thereof and disposed midway thereof, said member having another plate pivotally mounted at its upper rear edge, means on the plate for holding the swinging plate to its shifted positions coacting means on the two plates for limiting the downward swing of the pivoted plate, and a device for holding the said plate to its upper and lowermost positions, operable from the vehicle carriage, as set forth.

3. The combination with the cross bar 2, the plate $a$ bolted thereon and projected rearwardly thereof midway the ends of the bar 2, said bar having its extension slotted, the member E pivotally connected at its upper rear end with plate $a$, said member having a forwardly extended diagonal slot and an elongated aperture, the lower end of the member E having upper bearing faces, a spring mounted in the plate $a$ for engaging the member E to hold it to its different positions, the flexible member that seats midway its length in the enlarged aperture in the member E, the whiffletree mounted on the bar 2, trace bolts slidably mounted in the outer ends of the said whiffletree, said ends having trace guard members, said bolts being spring moved to the outer or trace holding position, and having their inner ends connected with the opposite ends of the flexible member all being arranged substantially as shown and for the purposes described.

ERNST MARZINKE.

Witnesses:
FRED S. ALDEN,
E. P. KIDDER.